United States Patent
Zhu et al.

(10) Patent No.: US 9,978,403 B1
(45) Date of Patent: May 22, 2018

(54) CHANGING WRITE COIL CURRENT IN RESPONSE TO READER INSTABILITY

(71) Applicant: Seagate Technology LLC, Cupertino, CA (US)

(72) Inventors: Wenzhong Zhu, Apple Valley, MN (US); Alfredo Sam Chu, Prior Lake, MN (US); Siew Kin Chow, Shakopee, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days. days.

(21) Appl. No.: 15/435,839

(22) Filed: Feb. 17, 2017

(51) Int. Cl.
| | |
|---|---|
| *G11B 21/02* | (2006.01) |
| *G11B 5/31* | (2006.01) |
| *G11B 5/60* | (2006.01) |
| *G11B 5/48* | (2006.01) |
| *G11B 5/39* | (2006.01) |
| *G11B 13/04* | (2006.01) |
| *G11B 11/105* | (2006.01) |
| *G11B 5/00* | (2006.01) |

(52) U.S. Cl.
CPC .......... *G11B 5/3123* (2013.01); *G11B 5/3103* (2013.01); *G11B 5/3106* (2013.01); *G11B 5/3133* (2013.01); *G11B 5/3967* (2013.01); *G11B 5/4826* (2013.01); *G11B 5/4866* (2013.01); *G11B 5/607* (2013.01); *G11B 5/6088* (2013.01); *G11B 11/10504* (2013.01); *G11B 13/04* (2013.01); *G11B 2005/0021* (2013.01)

(58) Field of Classification Search
CPC ..... G11B 27/36; G11B 5/012; G11B 27/3027; G11B 2220/90; G11B 5/02; G11B 5/6005; G11B 5/59633; G11B 5/54
USPC .......... 360/31, 25, 48, 75, 69, 53, 46, 77.03
See application file for complete search history.

(56) References Cited

U.S. PATENT DOCUMENTS

| | | | |
|---|---|---|---|
| 4,970,621 A | 11/1990 | Gailbreath et al. | |
| 5,189,566 A | 2/1993 | Christensen et al. | |
| 6,249,394 B1 | 6/2001 | Li et al. | |
| 6,587,295 B1 | 7/2003 | Kiyono et al. | |
| 6,957,379 B1 * | 10/2005 | Patapoutian ..... | G11B 20/10009 360/31 |
| 6,999,256 B2 * | 2/2006 | Kim ....... | G11B 5/012 360/25 |
| 8,009,379 B2 * | 8/2011 | Williams ...... | G11B 20/18 360/68 |

* cited by examiner

*Primary Examiner* — Nabil Hindi
(74) *Attorney, Agent, or Firm* — Hollingsworth Davis, LLC

(57) ABSTRACT

Data is written to a recording medium via a read/write head. Subsequent to the writing, the data is read via a read transducer of a read/write head. An instability indicator is derived based on measurements performed while the reading the data. If the instability indicator exceeds a threshold, a current applied to a write coil of the read/write head is changed for subsequent write operations.

19 Claims, 6 Drawing Sheets

CHANGING WRITE COIL CURRENT IN RESPONSE TO READER INSTABILITY

SUMMARY

The present disclosure is directed to changing a write coil current in response to reader instability. In one embodiment, data is written to a recording medium using a read/write head. The read/write head includes a magnetic write coil and an energy source that heats the media while recording. The data is read via a read transducer of the read/write head subsequent to the writing. An instability indicator is derived based on measurements performed while reading the data. If the instability indicator exceeds a threshold, a current applied to the write coil is changed for subsequent write operations.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
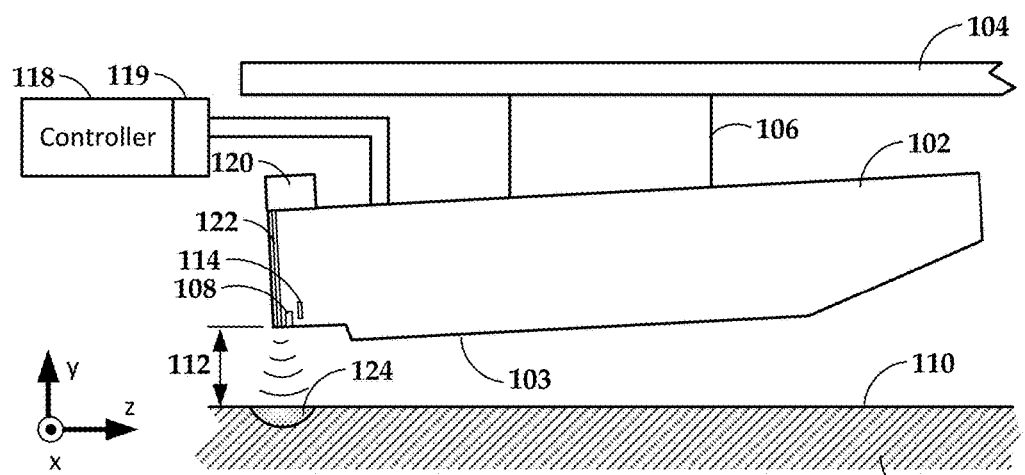
FIG. 1 is a view of a slider assembly according to an example embodiment.

The present disclosure generally relates to data storage devices that utilize magnetic storage media, e.g., disks. Data storage devices described herein may use a particular type of magnetic data storage known as heat-assisted magnetic recording (HAMR), also referred to as energy-assisted magnetic recording (EAMR), thermally-assisted magnetic recording (TAMR), and thermally-assisted recording (TAR). This technology uses an energy source such as a laser to create a small hotspot on a magnetic disk during recording. The heat lowers the magnetic coercivity at the hotspot, allowing a write transducer to change magnetic orientation, after which the hotspot is allowed to rapidly cool. Due to the relatively high coercivity of the medium after cooling, the data is less susceptible to data errors due to thermally-induced, random fluctuation of magnetic orientation known as the superparamagnetic effect.

A HAMR device uses a near-field transducer to concentrate optical energy into a hotspot in a recording layer. The hotspot raises the media temperature locally, reducing magnetic coercivity, thereby reducing the writing magnetic field required for high-density recording. A waveguide integrated into a read/write head can be used to deliver light to the near-field transducer. Light from a light source, such as an edge-emitting laser diode, is coupled into the waveguide through waveguide input coupler or a spot size converter. The light source may be mounted to an outside surface of the read/write head.

This disclosure describes techniques used to deal with reader instability when reading back recorded data. In a HAMR drive, reader instability has been found to be induced in some cases by previously-occurring write operations. This instability can increase bit error rate (BER) during reading, sometimes to such an extent that a sector fails to converge. This triggers directed error recovery procedures. If these procedures can't recover the sector, the drive may be considered as having failed (e.g., drives used in enterprise applications). One way that a directed recovery procedure may try to recover the bad sector is thermal annealing. However, thermal annealing may not be effective in cases where reader instability is induced by magnetic fields affecting the reader from previous writing operations.

In embodiments describe below, when read performance data is collected (e.g., BER, non-converging sectors, number of iterations to converge in channel decoder). If the read performance data predicts reader instability due to magnetic write fields, the write power (e.g., power applied to a magnetic write coil) is backed off. While the changing of write power may not cure the current instability, it may reduce the occurrence of subsequent read errors. This change of write power may be accompanied by other changes to compensate for the change in write power. For example, a clearance heater may be changed to compensate for a change in writer-induced protrusion. For a HAMR device, a laser power may be changed to compensate for the change in power applied to the write coil.

In FIG. 1, a block diagram is a side view of a HAMR read/write head 102 according to an example embodiment. The read/write head 102 may also be referred to herein as a slider, write head, read head, recording head, etc. The read/write head 102 is coupled to an arm 104 by way of a suspension 106, e.g., a gimbal. The read/write head 102 includes read/write transducers 108 at a trailing edge that are held proximate to a surface 110 of a magnetic recording medium 111, e.g., a magnetic disk. When the read/write head 102 is located over surface 110 of recording medium 111, a flying height 112 is maintained between the read/write head 102 and the surface 110 by a downward force of arm 104. This downward force is counterbalanced by an air cushion that exists between the surface 110 and an air bearing surface (ABS) 103 (also referred to herein as a "media-facing surface") of the read/write head 102 when the recording medium 111 is rotating.

In order to provide control of the clearance between the read/write transducers 108 and the recording medium 111, one or more clearance actuators 114 (e.g., heaters) are formed in the read/write head 102. A current applied to the heater 114 induces a local protrusion which varies the clearance. The amount of current applied to the heater 114 may vary based on which of the read/write transducers 108 are in use, and may also be adjusted to account for irregularities in the media surface 110, changes in ambient temperature, location of the read/write head 102 over the medium 111, etc.

A controller 118 is coupled to the read/write transducers 108, as well as other components of the read/write head 102, such as heaters 114, sensors, etc. The controller 118 may be part of general- or special-purpose logic circuitry that controls the functions of a storage device that includes at least the read/write head 102 and recording medium 111. The controller 118 may include or be coupled to a read/write channel 119 that include circuits such as preamplifiers, buffers, filters, digital-to-analog converters, analog-to-digital converters, decoders, encoders, etc., that facilitate electrically coupling the logic of the controller 118 to the signals used by the read/write head 102 and other components.

The illustrated read/write head 102 is configured as a HAMR device, and so includes additional components that form a hotspot 124 on the recording medium 111 near the read/write transducer 108. These components include a laser 120 (or other energy source) and a waveguide 122. The waveguide 122 delivers light from the laser 120 to components near the read/write transducers 108, such as a near-field transducer that emits a tightly focused stream of energy to form the hotspot 124. The read/write transducers 108 also include a magnetic pole that applies a magnetic field to the hotspot 124 and the surrounding area. Because of the high coercivity of the recording medium 111, only the hotspot 124 is affected by the magnetic field due to the material being heated above the Curie temperature. Therefore, the size and shape of the hotspot 124 affects the location of magnetic transitions written to the recording medium 111, which can affect the size and location of the bits of data defined by the transitions.

Figure 2:
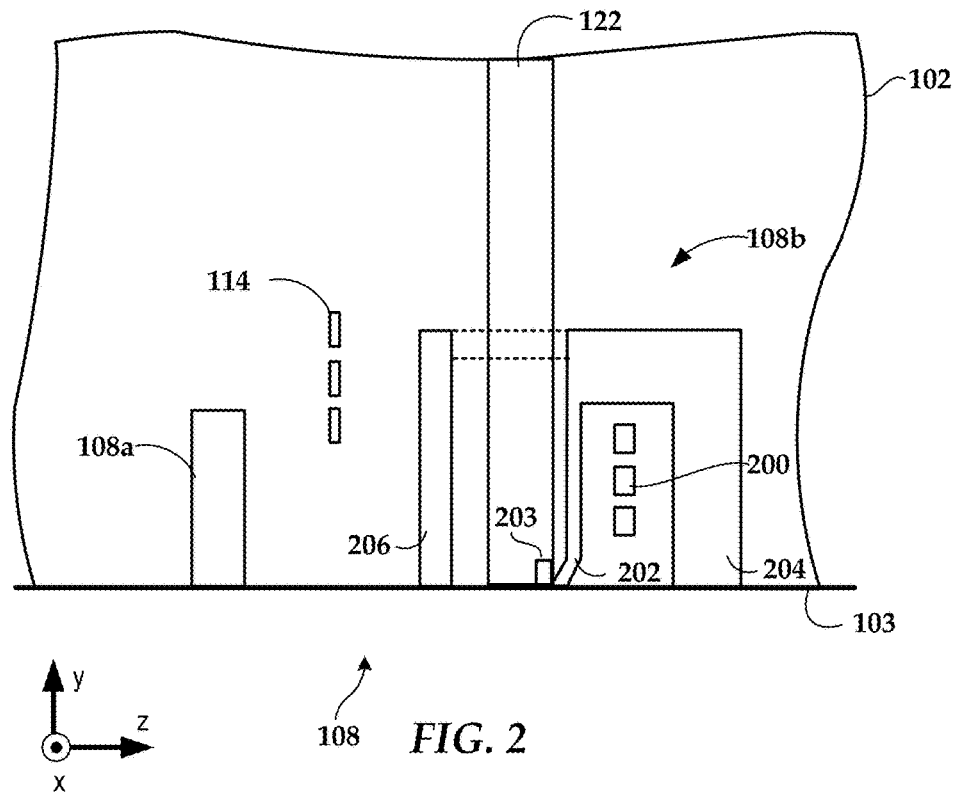
FIG. 2 is a view of a read and write transducers according to an example embodiment.

In FIG. 2, a block diagram illustrating a cross-sectional view of the read/write head 102 near the read/write transducers 108 according to an example embodiment. A read transducer 108a is located downtrack from a write transducer 108b. The read transducer 108a may be configured as a magnetoresistive stack (e.g., giant magnetoresistive, tunnel magnetoresistive, etc.) surrounded by magnetic shields. The write transducer 108b includes a coil 200 that, when energized, induces magnetic flux through a write pole 202 and return poles 204, 206. The aforementioned waveguide 122 delivers light to a near-field transducer 203 located near the write pole 202.

Figure 3:
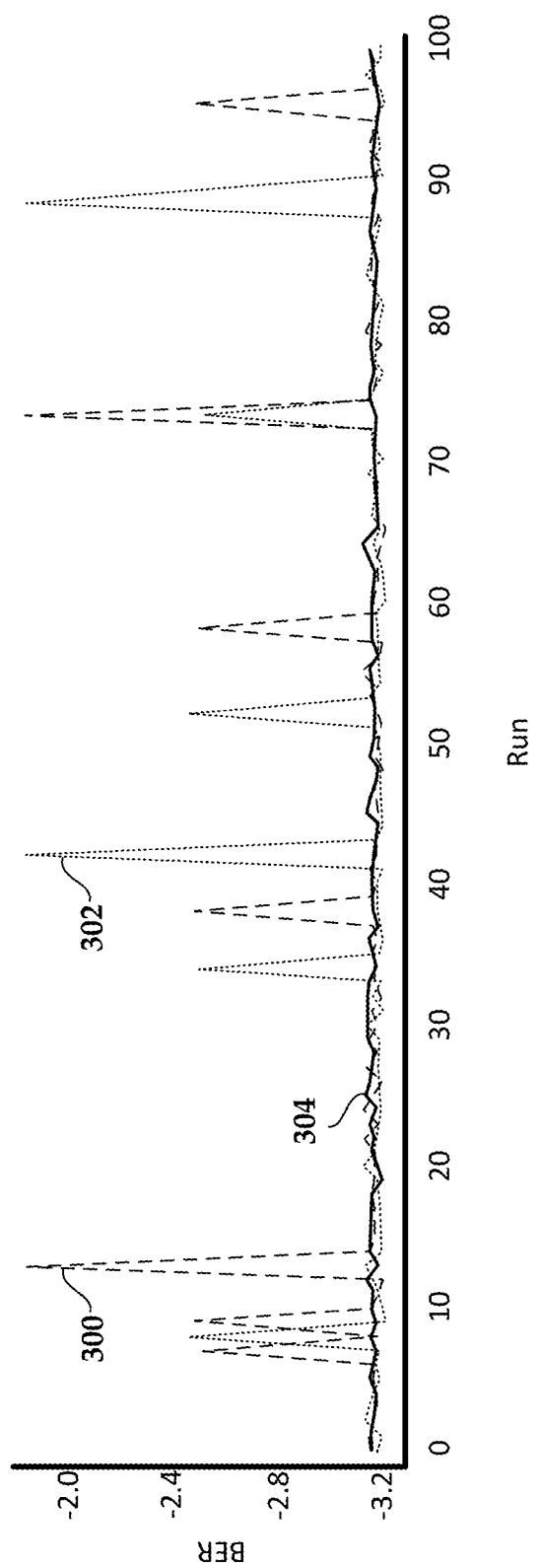
FIG. 3 is a graph showing reader instability in a drive according to an example embodiment.

As noted above, the read transducer 108a may become unstable in response to prior activation of the write transducer 108b. In FIG. 3, a graph shows testing data for a hard drive according to an example embodiment. In this procedure, a first track is written to, after which a second, nearby track is read back and read-only bit-error rate (BER) for the second track is measured (e.g., via a soft-output Viterbi algorithm). This is repeated for 100 times for each of three different cases using different combinations write coil current (Iw) and laser activation current (Iop) during the writing part. Curve 300 is the BER for writes using normal levels of both Iw and Iop. Curve 302 is the BER for writes with normal Iw but zero Iop. Curve 304 is the BER for writes with normal Iop but zero Iw. It can be clearly seen that BER jumps for curves 300 and 302 where the write coil was activated. In some cases the BER jumps close 1.5 decade. The BER is stable for curve 304, which suggests the cause is the write coil inducing the instability, and not the laser.

It has been found that the write-induced reader instability is sensitive to write power, which is proportional to the square of Iw. The high magnetic fields generated from write coil 200 can move/create domain walls in reader shields/magnetic seed. The wall pinned near the reader 108a can inject noise into stack after the writer 108b has been activated. Embodiments described below implement write power backoff and/or different in current reader instability test to mitigate write-induced reader instability.

Figure 4:
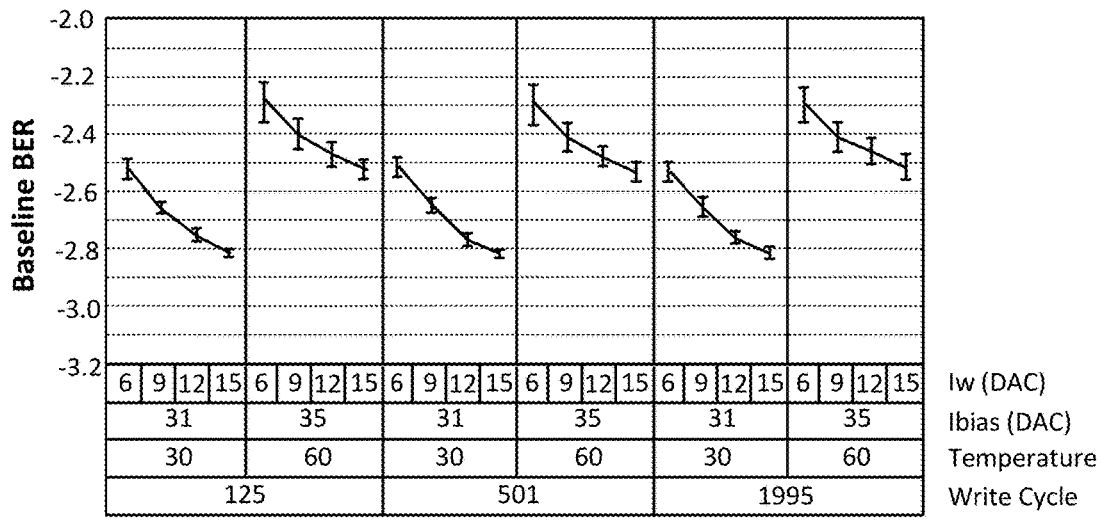
FIGS. 4 and 5 are graphs showing bit error rate in a drive according to an example embodiment.
Figure 5:
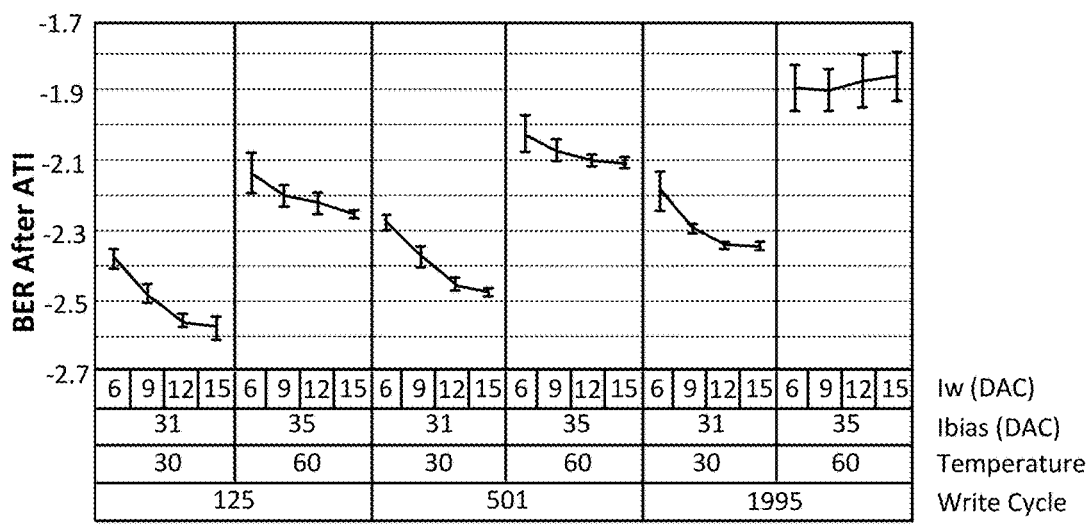
Figures 6, 7:
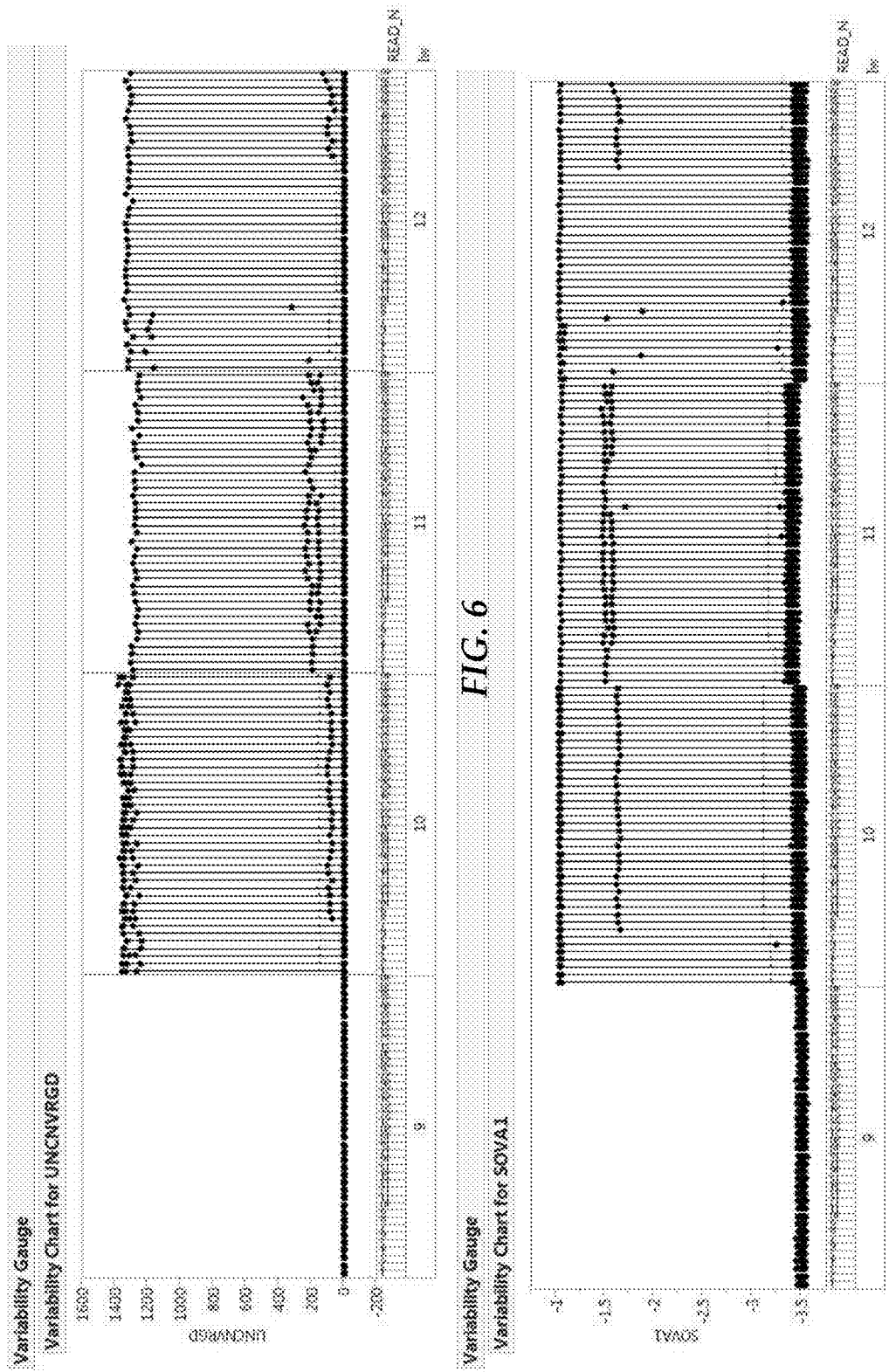
FIGS. 6 and 7 are graphs showing variability of read errors in a drive according to an example embodiment.

Graphs in FIGS. 4 and 5 show write current vs. BER before and after an write/read test for a HAMR drive according to an example embodiment. Note that the write current is shown as input values to a digital to analog converter (DAC) that is used to drive the write coil. As it can be seen, HAMR achieves better BER with a higher write power. However, higher write power induces more reader instability, which is shown in the graphs of FIGS. 6 and 7, which shows tests on a HAMR hard drive similar to that used to obtain the results for FIGS. 4 and 5. The graph in FIG. 6 shows the number of unconverged sectors vs. write current for a similar HAMR hard drive.

The graph in FIG. 7 shows BER of a soft output Viterbi algorithm (SOVA) BER vs. write current. At the default write current (DAC=12), the drive reports a significant number of un-converged sectors and SOVA BER jumps back and forth between −3.5 and unconverged states. When the write current is gradually reduced to DAC=9, all sectors are converged and SOVA BER stays at ~−3.5. In addition to adjusting Iw (which is steady-state write current), other write values can also be adjusted, such as overshoot current amplitude and overshoot current duration.

A method that can be implemented in a factory hard disk drive test involves setting a write back-off value (e.g., a decrement of write current DAC, decrement of write current overshoot amplitude DAC). When the drive fails a reader instability test, write current and/or overshoot are iteratively reduced and the reader instability test is re-run until it passes. The pass/fail criterion is determined based on whether a target BER or number of unconverged sectors is reached at a lower write power.

Figure 8:
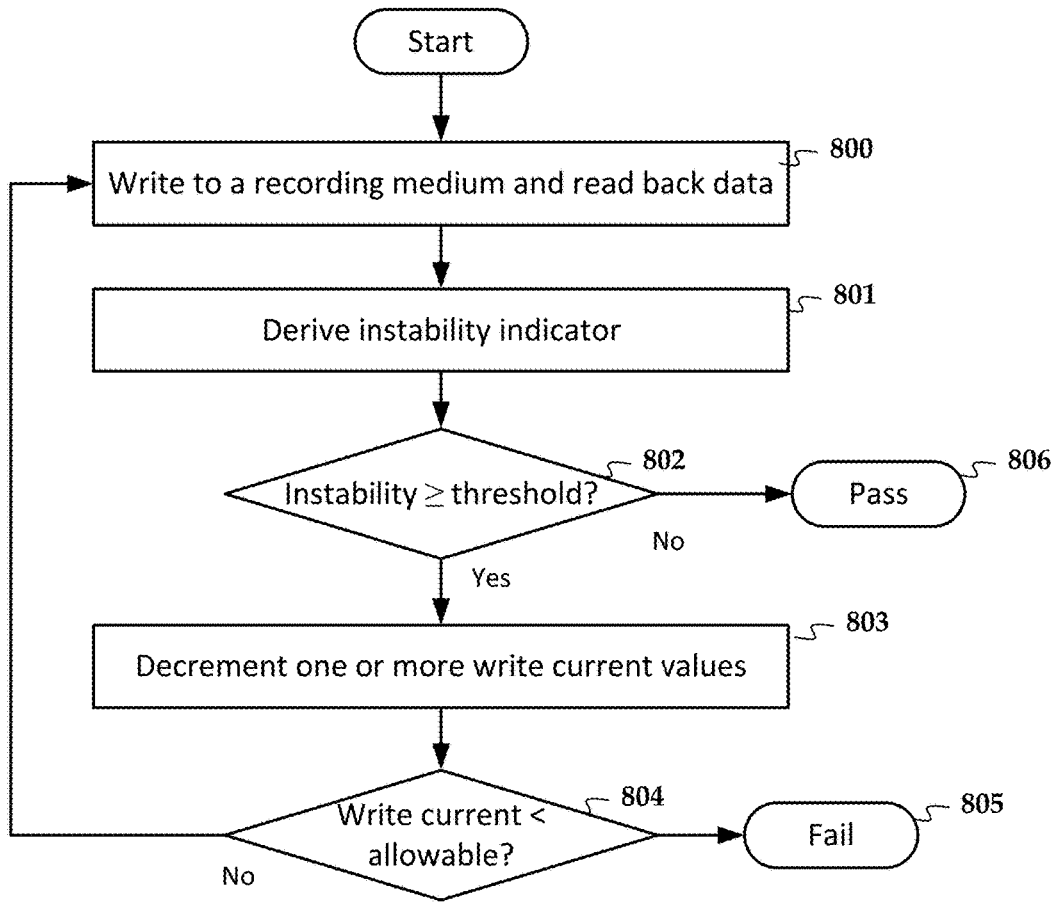
FIG. 8 is a flowchart of a method according to an example embodiment.

In FIG. 8, a flowchart shows a test procedure according to an example embodiment. The method involves writing and reading back data 800 from a recording medium. The writing and reading operations 800 may be, for example, part of an instability test that is performed during qualification of hard disk drive. The instability test involves writing test tracks multiple times. For each write, each track is read multiple times to get sector BER and channel information, and this data is stored. Using the stored data, statistics are calculated for each head, such as total unconverged sectors, max/min/mean of BER, max/min/mean of channel iterations (e.g., from SOVA), variance of mean of BER, variance of mean of channel iterations.

The writing and reading at block 800 provides data that can be used to derive 801 a full or partial instability indicator. For example a full instability indicator may encompass all of the radially defined zones on the disk and may specify some numbers of tracks within each zone. A full instability indicator is an output of the instability test and is representative of the performance over the entire disk surface. The full instability indicator can be recorded as part of the drive qualification to decide if the drive should be failed or whether the drive's operation/configuration is modified or otherwise limited to account for the predicted instability. However, as will be described below, blocks 800 and 801 may be repeated multiple times, and for some of the iterations, it may not be necessary to read all of the zones to determine whether instability is improved in each iteration. In such a case, partial instability indicator can be derived by writing and reading less data on the disk than the initial writing and reading (first time blocks 800 and 801 are entered). This may involve targeting a predetermined subset of the disk area (e.g., each $n^{th}$ zone) or selecting subset of disk regions based on the initial stability results (e.g., n-regions with highest instability indicators).

If the full or partial instability indicator is equal to or exceeds a threshold, as determined at block 802, then one or more write current values (e.g., overshoot current, steady-state current) are decremented 803. A check 804 is made to see if the decremented write current is not below some allowable limit, in which case the procedure exits with a fail 805. Other criteria may be used to limit the number of times the current is decremented at block 803. For example, a counter may be used to determine the number of times block 803 is entered, and the procedure quits with a fail condition 805 if this counter exceeds a threshold.

If the procedure exits block 804 on the 'no' branch, then data is again written/read 800, a full or partial instability indicator is again derived and tested 801, 802. The performing of the read/write at block 800 after the first time may involve adjusting other parameters. For example, for a HAMR drive, an adjustment (e.g., increase) of laser power may be performed to compensate for the lowered write field. A clearance heater current may also be adjusted to account for a change in writer-induced protrusion. Also, the test performed at block 800 may be different depending on whether it is the first time it is performed or if it is performed again after blocks 801-804, e.g., deriving a partial instability indicator at blocks 800 and 801.

After performing the write/read 800, either the first time or subsequent to performing adjustment of write current, if instability indicator is below the threshold, the procedure exits along the "no" branch of block 802, and a pass condition 806 is registered. It should be noted that the pass/fail conditions 806, 805 may be for just this phase of a full qualification test. For example, if the write current is lowered 803 and instability indicator is below threshold at block 802, indicating a pass, other tests may be performed or repeated to make sure other aspects of the drive's performance are able to pass. For example, the full instability test could be retaken so that an updated, full instability indicator is recorded for this phase of the qualification testing.

Figure 9:
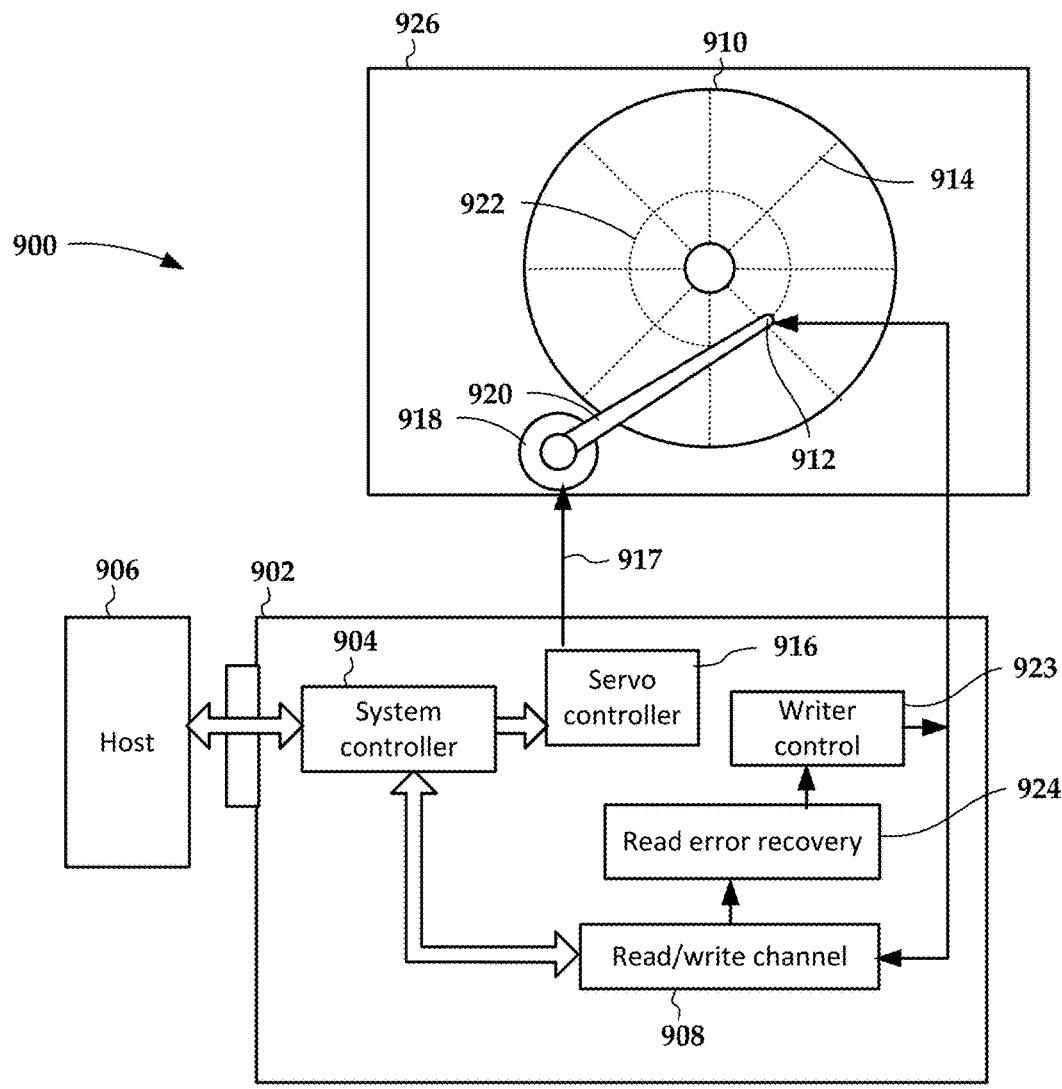
FIG. 9 is a block diagram of an apparatus according to an example embodiment.

In FIG. 9, a block diagram illustrates an apparatus 900 according to an example embodiment. Control logic circuit 902 of the apparatus 900 includes a system controller 904 that processes read and write commands and associated data from a host device 906. The host device 906 may include any electronic device that can be communicatively coupled to store and retrieve data from a data storage device, e.g., a computer, peripheral card, etc. The system controller 904 is coupled to a read/write channel 908 that reads from and writes to a surface of a magnetic disk 910.

The read/write channel 908 generally converts data between the digital signals processed by the system controller 904 and the analog signals conducted through one or more read/write heads 912 during read operations. The read/write channel 908 may also send control signals to the read/write head 912 and receive sensor signals from the read/write heads 912. To facilitate the read operations, the read/write channel 908 may include analog and digital circuitry such as preamplifiers, filters, decoders, digital-to-analog converters, timing-correction units, etc. The read/write channel 908 also provides servo data read from servo wedges 914 on the magnetic disk 910 to a servo controller 916. The servo controller 916 uses these signals to provide a voice coil motor (VCM) control signal 917 to a VCM 918. The VCM 918 rotates an arm 920 upon which the read/write heads 912 are mounted in response to the voice coil motor control signal 917.

The apparatus 900 is a HAMR device, and therefore the read/write heads 912 include an energy source (e.g., laser diode) that heats the magnetic disk 910 when recording. A writer control module 923 (e.g., via read/write channel 908) sends a current to activate the laser together with a magnetic writer current (e.g., write coil current) when recording. In some instances, the write coil current may trigger instability in a read transducer of the read/write heads 912, e.g., when performing a test procedure such as instability test. This results in errors detected by a read error recovery module 924. The detected errors may include a BER above a threshold, unrecoverable error for a threshold number of data or servo sectors, number of channel iterations before convergence, etc.

In response to the errors, the read error recovery module 924 directs the read/write head 912 to reduce a write current parameter, e.g., steady-state current, overshoot amplitude, overshoot duration. Another procedure is performed to test the effect of the change in write current. This may be the same procedure that triggered the error threshold, or a different procedure that tests the stability of the reader in response to write activity. The read error recovery module 924 may cause the apparatus 900 to write using changed write parameters to avoid the instability, and may make other changes, e.g., to HAMR laser power and clearance, to compensate for the changes made to the write parameters.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. In other embodiments, custom logic circuits may be constructed/configured to provide this functionality. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
   writing data to a recording medium using a read/write head comprising a magnetic write coil and an energy source that heats the media while recording;
   reading the data via a read transducer of the read/write head subsequent to the writing;
   deriving an instability indicator of the read transducer based on measurements performed while reading the data, the instability indicator due to a magnetic field generated by the write coil affecting a domain wall in the read transducer during the writing; and
   if the instability indicator exceeds a threshold, changing a current applied to the write coil for subsequent write operations.

2. The method of claim 1, wherein changing the current comprises lowering a steady-state current.

3. The method of claim 2, wherein changing the current further comprises changing an overshoot amplitude.

4. The method of claim 1, wherein a laser current applied to the energy source is also changed for subsequent write operations in response to changing the current.

5. The method of claim 1, wherein the writing and the reading of the data and deriving of the instability indicator are performed during qualification of a hard drive that includes the read/write head.

6. The method of claim 1, wherein the measurements comprise a combination of: bit error rate, number of unconverged sectors, and number of channel iterations before convergence.

7. The method of claim 1, further comprising, after changing the current, performing subsequent writing and reading of data to determine that a subsequent instability indicator based on the subsequent writing and reading is at or below the threshold.

8. The method of claim 7, wherein the subsequent instability indicator is derived from writing and reading less data than the initial writing and reading.

9. An apparatus comprising:
a read write head comprising a read transducer and a write transducer configured to respectively read from and write to a heat-assisted magnetic recording medium;
control circuitry coupled to the read/write head and configured to:
write data to the recording medium using a magnetic write coil of the write transducer;
read the data via the read transducer subsequent to the writing;
deriving an instability indicator of the read transducer based on measurements performed while reading the data, the instability indicator due to a magnetic field venerated by the write coil affecting a domain wall in the read transducer during the writing; and
change a current applied to the write coil for subsequent write operations in response to determining the instability indicator has exceeded the threshold.

10. The apparatus of claim 9, wherein changing the current comprises lowering a steady-state current.

11. The apparatus of claim 9, wherein changing the current further comprises changing an overshoot amplitude.

12. The apparatus of claim 9, wherein a laser current applied to an energy source of the write transducer is also changed for subsequent write operations in response to changing the current.

13. The apparatus of claim 9, wherein the writing and the reading of the data and deriving of the instability indicator are performed during qualification of the apparatus.

14. The apparatus of claim 9, wherein the measurements comprise a combination of: bit error rate, number of unconverged sectors, and number of channel iterations before convergence.

15. The apparatus of claim 9, wherein the control circuitry is further configured to, after changing the current, perform subsequent writing and reading of data to determine that a subsequent instability indicator based on the subsequent writing and reading is at or below the threshold.

16. The apparatus of claim 15, wherein the subsequent instability indicator is a partial indicated derived from writing and reading less data than the initial writing and reading.

17. A method comprising:
performing at least one test iteration comprising:
writing data to a recording medium of the drive via a read/write head that applies a magnetic field to the drive;
reading the data via a read transducer of the read/write head subsequent to the writing;
storing read performance data in response to reading the data;
deriving an instability indicator based on the read performance data, the instability indicator predicting an instability in the read transducer induced by the magnetic field affecting a domain wall in the read transducer during the writing; and
in response to determining that the instability indicator has exceeded a threshold, reducing a current applied to the write coil for subsequent write operations.

18. The method of claim 17, wherein the test iteration is repeated until the instability indicator is at or below a threshold or the current is below a write current threshold.

19. The method of claim 17, wherein the read performance data comprise a combination of: bit error rate, number of unconverged sectors, and number of channel iterations before convergence.

* * * * *